(12) United States Patent
Chiba

(10) Patent No.: US 9,934,188 B2
(45) Date of Patent: Apr. 3, 2018

(54) ELECTRONIC DEVICE WITH CONNECTOR FOR VIDEO SIGNAL INTERFACE

(71) Applicant: Kabushiki Kaisha Toshiba, Minato-ku, Tokyo (JP)

(72) Inventor: Hiroaki Chiba, Sagamihara Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 15/016,967

(22) Filed: Feb. 5, 2016

(65) Prior Publication Data

US 2017/0060804 A1 Mar. 2, 2017

Related U.S. Application Data

(60) Provisional application No. 62/210,664, filed on Aug. 27, 2015.

(51) Int. Cl.
| | |
|---|---|
| G06F 13/10 | (2006.01) |
| G06F 13/40 | (2006.01) |
| G06F 1/16 | (2006.01) |
| G06F 13/42 | (2006.01) |

(52) U.S. Cl.
CPC ........ *G06F 13/4081* (2013.01); *G06F 1/1632* (2013.01); *G06F 13/4022* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 8,421,602 | B2 * | 4/2013 | Madonna | G01S 5/02 340/12.22 |
| 9,807,451 | B2 * | 10/2017 | Xu | H04N 21/43635 |
| 2010/0066919 | A1 | 3/2010 | Nakajima et al. | |
| 2010/0118188 | A1 * | 5/2010 | Nakajima | H04N 5/775 348/467 |
| 2010/0128176 | A1 | 5/2010 | Nakajima et al. | |
| 2010/0129062 | A1 | 5/2010 | Nakajima et al. | |
| 2010/0253841 | A1 | 10/2010 | Nakajima et al. | |
| 2010/0269137 | A1 | 10/2010 | Nakajima et al. | |
| 2010/0289530 | A1 | 11/2010 | Nakajima et al. | |
| 2011/0085473 | A1 | 4/2011 | Nakajima et al. | |

(Continued)

FOREIGN PATENT DOCUMENTS

| | | |
|---|---|---|
| JP | 2009-094663 | 4/2009 |
| JP | 2013-513193 | 4/2013 |
| JP | 2015-019390 | 1/2015 |

*Primary Examiner* — Cheng-Yuan Tseng
(74) *Attorney, Agent, or Firm* — Knobbe, Martens, Olson & Bear, LLP

(57) ABSTRACT

According to one embodiment, an electronic device includes a housing including a connector configured to connect to an external device, a transmitter and a receiver. The transmitter communicates with a sink device via the connector. The receiver communicates with a source device via the connector. If the connector is set as an output port for outputting a video signal, the transmitter is connected to the connector via first, second and third switching circuits. If the connector is set as an input port for inputting a video signal, the receiver is connected to the connector via the first, second and third switching circuits.

8 Claims, 6 Drawing Sheets

(56) References Cited

U.S. PATENT DOCUMENTS

| | | |
|---|---|---|
| 2012/0000703 A1 | 1/2012 | Kim et al. |
| 2012/0000705 A1 | 1/2012 | Cornelius et al. |
| 2012/0005496 A1 | 1/2012 | Baker et al. |
| 2012/0103651 A1 | 5/2012 | Kim |
| 2012/0152613 A1 | 6/2012 | Kim et al. |
| 2012/0215950 A1 | 8/2012 | Anderson |
| 2012/0226774 A1 | 9/2012 | Hochsprung |
| 2012/0233489 A1 | 9/2012 | Cornelius et al. |
| 2012/0278832 A1 | 11/2012 | Nakajima et al. |
| 2013/0173936 A1 | 7/2013 | Baker et al. |
| 2014/0036156 A1* | 2/2014 | Nakajima ............... H04B 1/205 348/723 |
| 2014/0111696 A1 | 4/2014 | Nakajima et al. |
| 2014/0285722 A1 | 9/2014 | Nakajima et al. |
| 2014/0325573 A1 | 10/2014 | Nakajima et al. |
| 2014/0344615 A1 | 11/2014 | Cornelius et al. |
| 2014/0359319 A1 | 12/2014 | Baker et al. |
| 2015/0067195 A1* | 3/2015 | Sharma ................. H04N 5/765 710/14 |
| 2015/0081930 A1* | 3/2015 | Yu ......................... G06F 9/4411 710/14 |
| 2015/0358675 A1* | 12/2015 | Xu ......................... H04N 5/765 348/706 |
| 2016/0140075 A1* | 5/2016 | Kashyap ............. G06F 13/4265 710/104 |
| 2017/0060804 A1* | 3/2017 | Chiba ................. G06F 13/4081 |
| 2017/0116029 A1* | 4/2017 | Azam ................... G06F 9/4843 |

* cited by examiner

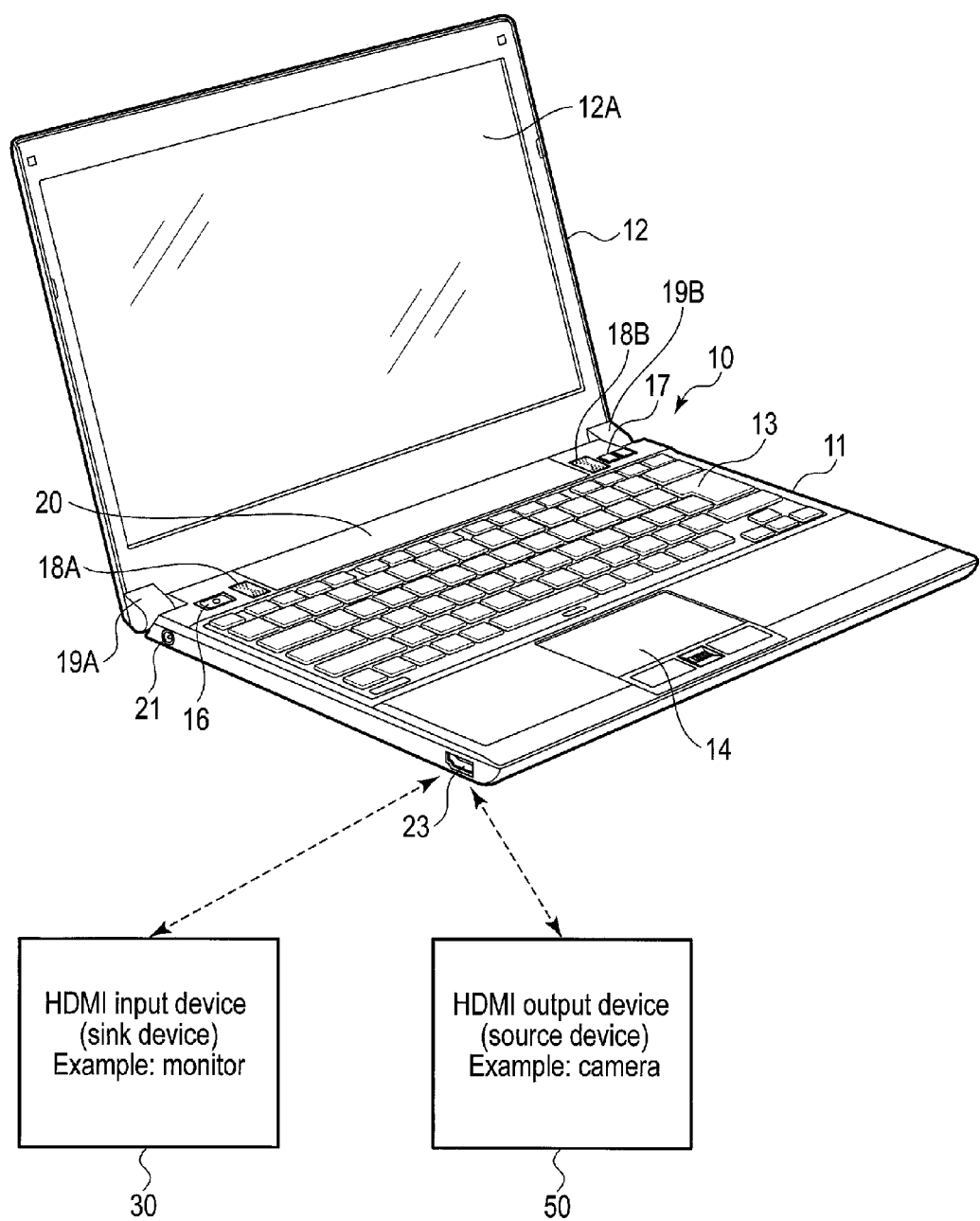
F I G. 1

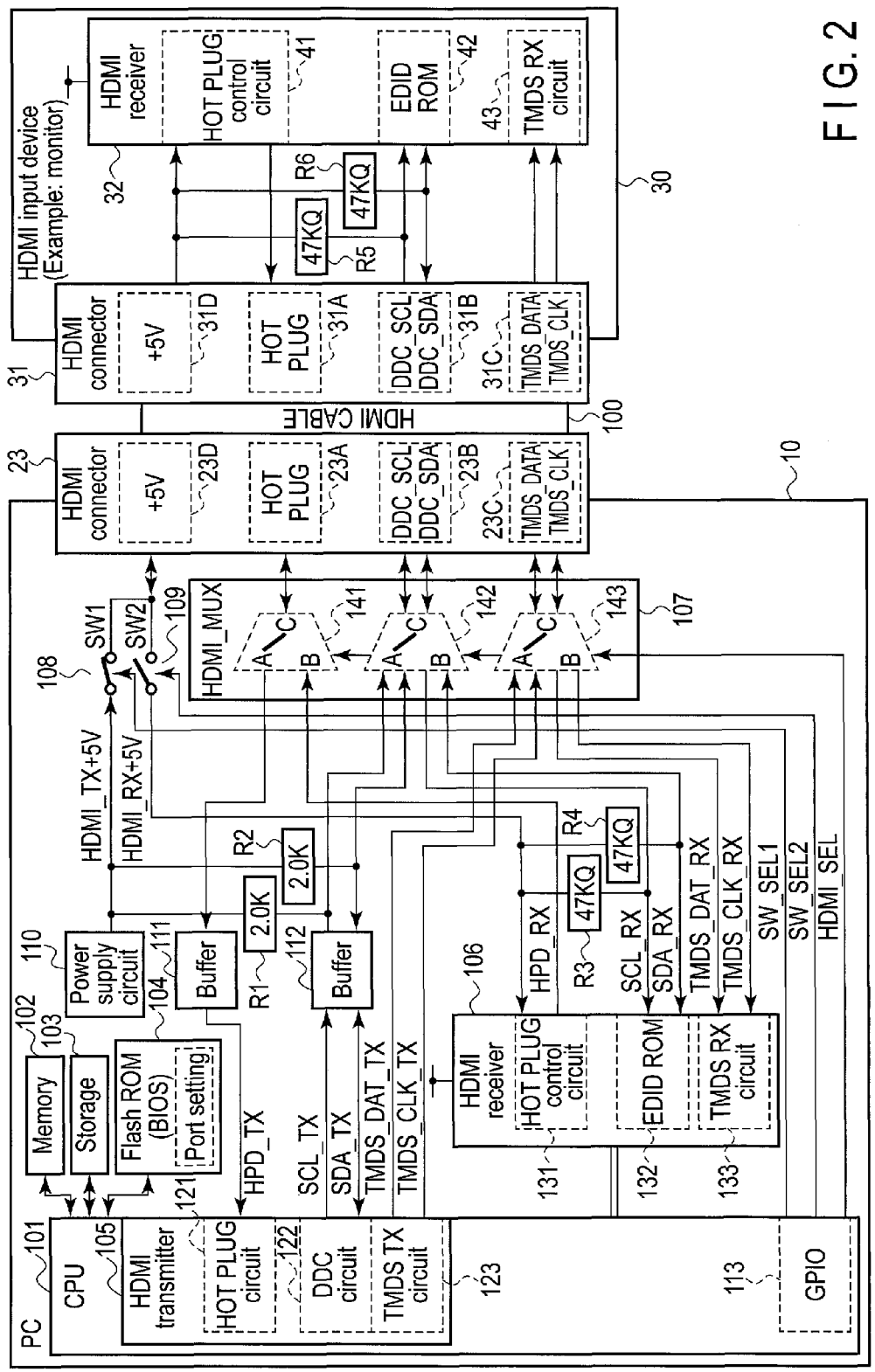
F I G. 2

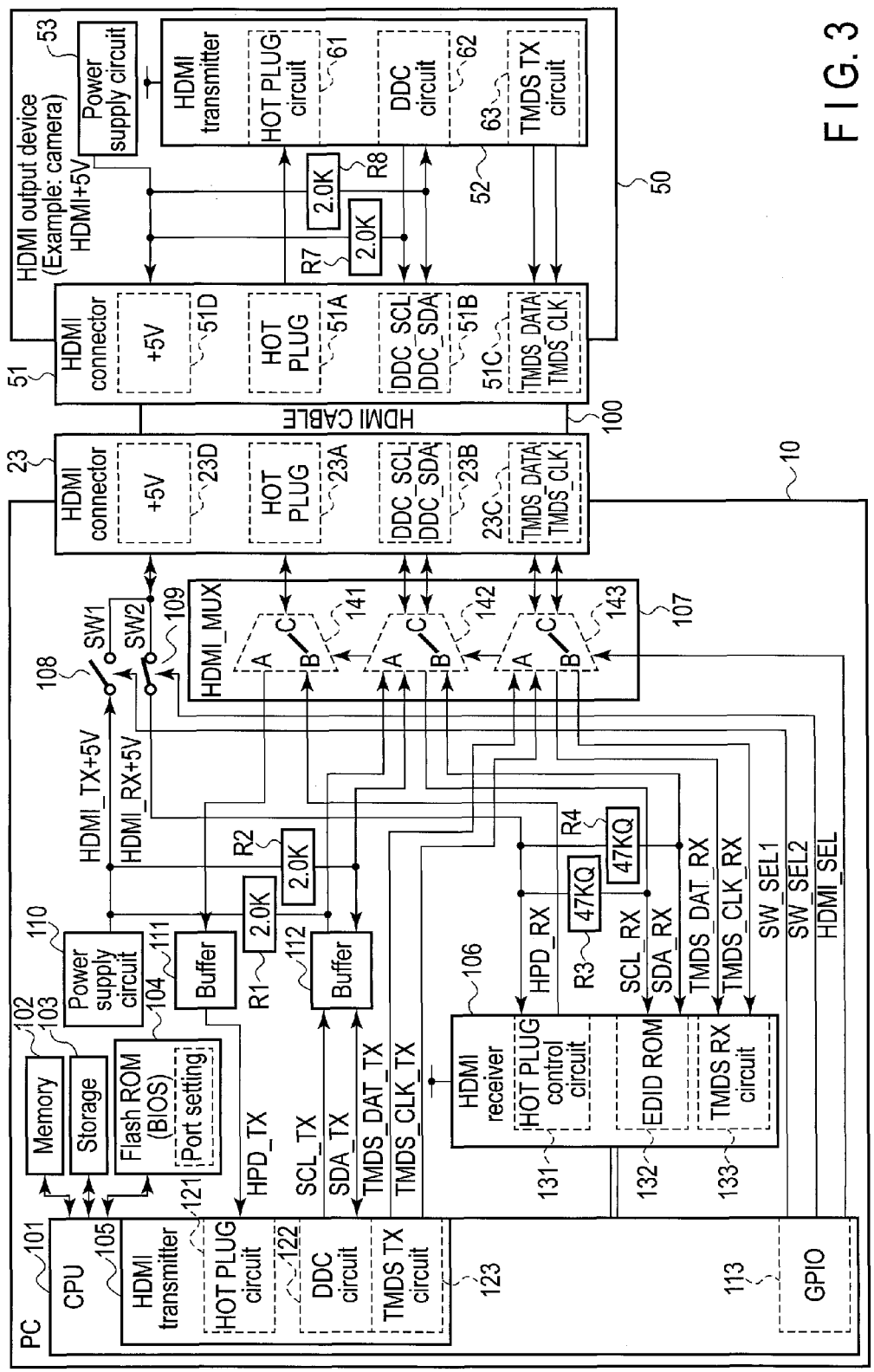
F I G. 3

ELECTRONIC DEVICE WITH CONNECTOR FOR VIDEO SIGNAL INTERFACE

CROSS-REFERENCE TO RELATED APPLICATIONS

This application claims the benefit of U.S. Provisional Application No. 62/210,664, filed Aug. 27, 2015, the entire contents of which are incorporated herein by reference.

FIELD

Embodiments described herein relate generally to a technology for communicating with an external device via a connector for a video-signal interface.

BACKGROUND

In recent years, various portable electronic devices such as notebook personal computers and tablet computers have been developed. These electronic devices comprise a connector for outputting video signals, such as a High-Definition Multimedia Interface (HDMI) output port. The electronic devices can transmit video signals to external devices (for example, monitors) connected to the connector.

In order to add the function to input video signals from an external device to such an electronic device, it is usually necessary to provide, in addition to the connector for outputting video signals, a separate additional connector for inputting video signals, on the electronic device.

However, for notebook personal computers, tablet computers and the like, there is only limited connector mounting space. For this reason, the structure which provides a total of two connectors for a video signal interface, one for outputting video signals and another for inputting video signals may not necessarily be appropriate.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing an appearance of the electronic device according to an embodiment.

FIG. 2 is an exemplary block diagram showing the relationship between the electronic device of the embodiment and an external device (HDMI input device).

FIG. 3 is an exemplary diagram showing the relationship between the electronic device of the embodiment and an external device (HDMI output device).

DETAILED DESCRIPTION

Figure 4:
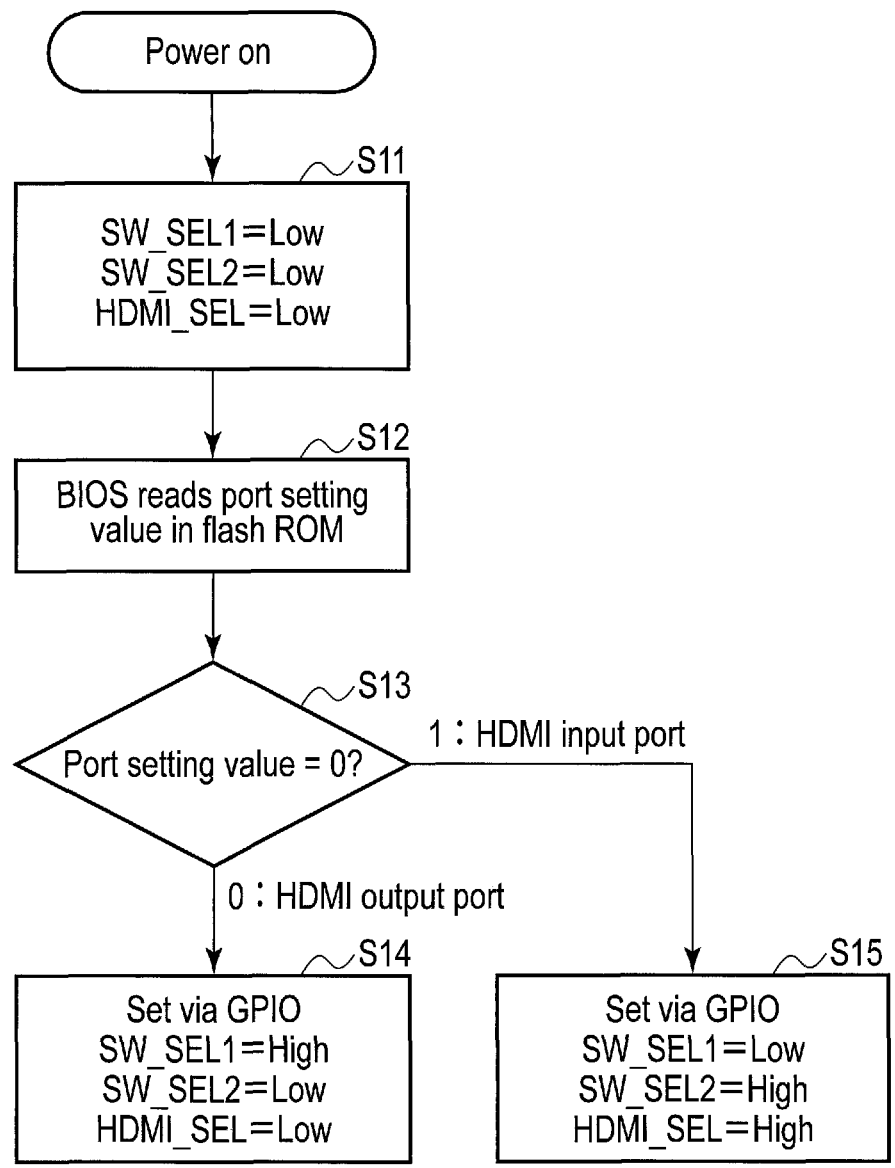
FIG. 4 is an exemplary flowchart of the procedure of the port setting processing executed by the electronic device of the embodiment.

Various embodiments will be described hereinafter with reference to the accompanying drawings.

In general, according to one embodiment, an electronic device comprises a housing with a connector configured to connect to an external device to be connected, a transmitter, a receiver, a first switching circuit, a second switching circuit and a third switching circuit. The connector includes a first pin to which a signal line for carrying a hot-plug detection signal is assigned, second pins to which signal lines for carrying capability information are assigned, and third pins to which signal lines for carrying at least video signals are assigned.

The transmitter communicates with a sink device via the connector. The transmitter comprises a hot-plug detection receiving circuit, a control circuit and a video transmitting circuit. The hot-plug detection receiving circuit receives a hot-plug detection signal from the sink device via the connector. The control circuit reads capability information of the sink device via the connector. The video transmitting circuit transmits a video signal to the sink device via the connector.

The receiver communicates with a source device via the connector. The receiver comprises a hot-plug detection transmitting circuit, a memory, and a video receiving circuit. The hot-plug detection transmitting circuit transmits a hot-plug detection signal to the source device via the connector. The memory holds capability information of the electronic device. The video receiving circuit receives a video signal from the source device via the connector.

The first switching circuit electrically connects either the hot-plug detection receiving circuit or the hot-plug detection transmitting circuit to the first pin. If the connector is set for an output port for outputting a video signal, the first switching circuit electrically connects the hot-plug detection receiving circuit to the first pin. If the connector is set for an input port for inputting a video signal, the first switching circuit electrically connects the hot-plug detection transmitting circuit to the first pin.

The second switching circuit electrically connects either the control circuit or the memory to the second pins. If the connector is set for the output port, the second switching circuit electrically connects the control circuit to the second pins. If the connector is set for the input port, the second switching circuit electrically connects the memory to the second pins.

The third switching circuit electrically connects either the video transmitting circuit or the video receiving circuit to the third pins. If the connector is set for the output port, the third switching circuit electrically connects the video transmitting circuit to the third pins. If the connector is set for the input port, the third switching circuit electrically connects the video receiving circuit to the third pins.

With reference to FIG. 1, the structure of the electronic device according to an embodiment will now be described. The electronic device can be realized, for example, as a notebook personal computer or a tablet computer. The following description is provided on the assumption that the electronic device is realized as a notebook personal computer 10.

FIG. 1 is a perspective view showing the computer 10 as viewed from its front side. The computer 10 is configured to receive power from a battery 20. The computer 10 comprises a computer main body 11 and a display unit 12. The display unit 12 includes a display device incorporated therein such as a liquid-crystal display (LCD) 12A as an internal display.

The display unit 12 is attached to the computer main body 11 so as to be freely rotatable between a closed position where a top surface of the computer main body 11 is covered by the display unit 12 and an open position where the top surface of the computer main body is exposed. A lower end of the display unit 12 is attached to a back end of the computer main body 11 through rotatable hinges 19A and 19B.

The computer main body 11 comprises a housing in the form of a thin box. On the top surface of the housing of the computer main body 11, are arranged a keyboard 13, a touchpad (pointing device) 14, a power switch 16 to turn the power to the computer 10 on and off, several function buttons 17, and loudspeakers 18A and 18B.

In addition, the computer main body 11 comprises a power connector 21. The power connector 21 is provided in a side or back surface of the computer main body 11, for example, in a left-hand side surface. An external power supply is detachably connectable to the power connector 21. As the external power supply, an AC/DC adapter can be used. The AC/DC adaptor is a power supply configured to convert commercial electric power (AC power) into DC power.

The battery 20 is detachably mounted on the back end of the computer main body 11, for example. The battery 20 may be a built-in battery for the computer 10.

The computer 10 is driven by the power from an external power supply or the battery 20. While the external power supply is connected to the power connector 21 of the computer 10, the computer 10 is driven by the power from the external power supply. The power from the external power supply is also used to charge the battery 20. While the external power supply is not connected to the power connector 21 of the computer 10, the computer 10 is driven by the power from the battery 20.

In addition, a connector 23 connectable with an external device is provided in the computer main body 11. The connector 23 is a connector for a video signal interface. The connector 23 comprises, at least, a pin to which a signal line for carrying a hot-plug detection signal is assigned, pins to which signal lines for carrying capability information are assigned, and pins to which signal lines for carrying at least video signals are assigned.

The connector 23 may be, for example, a High-Definition Multimedia Interface (HDMI) connector or a DisplayPort (DP) connector.

There are usually two types of connectors for video signal interfaces, an output connector (output port) for outputting video signals and an input connector (input port) for inputting video signals. In many cases, an output connector (output port) and an input connector (input port) have the same physical form.

Many portable devices are provided with an output connector (output port) to transmit video signals to an external device. Devices such as a monitor and television are provided with an input connector (input port).

In this embodiment, one connector 23 is selectively used as an output connector (output port) or an input connector (input port) so as to be able to effectively use the high display performance of the computer 10. That is, the connector 23 functions not only as an output port which can transmit a video signal to an external device (sink device), but also as an input port which can receive a video signal from an external device (source device). A source device is a device which has the ability to transmit a video signal and comprises an output connector (output port). A sink device is a device which has the ability to receive and display a video signal from an external device and comprises an input connector (input port).

The computer 10 comprises both a transmitter configured to communicate with an external device (sink device) via the connector 23 and a receiver configured to communicate with an external device (source device) via the connector 23. The transmitter comprises a hot-plug detection receiving circuit, a control circuit and a video transmitting circuit. The receiver includes a hot-plug detection transmitting circuit, a memory and a video receiving circuit. In addition, the computer 10 comprises several switching circuits to operate the single connector 23 selectively as an output connector (output port) or an input connector (input port).

The circuit to be connected to the pin to which the signal line for carrying a hot-plug detection signal is assigned is switched over between the hot-plug detection receiving circuit of the transmitter and hot-plug detection transmitting circuit of the receiver by the first switching circuit in the computer 10. The circuit to be connected to the pins to which the signal lines for carrying capability information are assigned is switched over between the control circuit of the transmitter and the memory of the receiver by the second switching circuit in the computer 10. The pins to which the signal lines for carrying at least a video signal are assigned is switched between the video transmitting circuit of the transmitter and the video receiving circuit of the receiver by the third switching circuit in the computer 10.

With this structure, the connector 23 can be shared by the video signal output function and the video signal input function. Therefore, the single connector 23 can realize both the video signal output function and the video input function, removing the need to provide two connectors, namely, the output connector for video output and the input connector for video input, on the computer main body 11.

In the case where the connector 23 is an HDMI connector, the connector 23 functions not only as an HDMI output port (HDMI output connector), but also as an HDMI input port (HDMI input connector). The physical form of an HDMI output connector is the same as that of an HDMI input connector.

The connector 23 may normally function as an HDMI output port (HDMI output connector), and may switch its function to an HDMI input port (HDMI input connector) when needed.

In the case where the connector 23 is set as an HDMI output port (HDMI output connector), an HDMI input device 30 can be connected to the connector 23. The HDMI input device 30 is a sink device such as a monitor. Therefore, by connecting the HDMI input device 30 to the connector 23 via an HDMI cable, screen images corresponding to the video signals transmitted from the computer 10 can be displayed on the display of the HDMI input device 30.

In the case where the connector 23 is set as the HDMI input port (HDMI input connector), an HDMI output device 50 can be connected to the connector 23. The HDMI output device 50 is a source device such as a camera. Therefore, by connecting the HDMI output device 50 to the connector 23 via an HDMI cable, screen images corresponding to the video signals (for example, video signals corresponding to a digital photograph) transmitted from the HDMI output device 50 can be displayed on LCD 12A of the computer 10. In other words, the computer 10 functions as a sink device.

FIG. 2 shows the relationship between the computer (PC) 10 and the HDMI input device 30.

The computer (PC) 10 comprises a CPU 101, a memory 102, a storage device 103 such as an SSD or HDD, a flash ROM 104, an HDMI transmitter 105, an HDMI receiver 106, an HDMI multiplexer (HDMI_MUX) 107, a switching circuit (SW1) 108, a switching circuit (SW2) 109, a power supply circuit 110 and the like.

The HDMI input device 30 includes an HDMI connector 31, an HDMI receiver 32 and the like. The HDMI input device 30 is connected to an HDMI connector 23 of the computer (PC) 10 via an HDMI cable 100.

The CPU 101 is a processor configured to control the operation of the components in the computer 10. The processor includes a processing circuit. The CPU 101 executes various programs loaded into the memory 102 from the storage device 103. These programs include an operating system, and various application programs and utility programs. The utility programs may include a port switching utility program. The port switching utility program executes a port switching process for switching the function of the HDMI connector 23 between the HDMI output port and the HDMI input port.

The CPU 101 also executes a basic input/output system (BIOS) stored in a flash ROM 104, which is a nonvolatile memory. The BIOS is firmware for controlling hardware. In this embodiment, the flash ROM 104 functions as a nonvolatile memory configured to store a port setting value (HDMI output port or HDMI input port) of the HDMI connector 23. The BIOS (that is, firmware) can set, in response to the computer 10 being powered on, the HDMI connector 23 to a mode (HDMI output port or HDMI input port) specified by the port setting value.

The HDMI connector 23 comprises a plurality of pins to which signals specified by the HDMI specification are assigned. More specifically, the HDMI connector 23 includes a pin 23A to which a signal line (HOT-PLUG) for carrying a hot-plug detection signal is assigned, pins 23B to which signal lines (DDC_SCL and DDC_SDA) for carrying capability information such as EDID, etc., are assigned, pins 23C to which signal lines (TMDS_DATA and TMDS_CLK) for carrying video signals are assigned, a pin 23D to which a +5V power signal line is assigned, and the like.

The HDMI transmitter 105 is configured to communicate with the HDMI input device (sink device) 30 via the HDMI connector 23. The HDMI transmitter 105 communicates with the HDMI input device 30 and transmits at least a video signal to the HDMI input device 30. The HDMI transmitter 105 may transmit both a video signal and an audio signal to the HDMI input device 30.

The HDMI transmitter 105 may be incorporated in the CPU 101. The HDMI transmitter 105 includes a hot-plug circuit 121, a display data channel (DDC) circuit 122, a video signal transmitting circuit (TMDS TX) 123 and the like.

The hot-plug circuit 121 functions as a hot-plug detection receiving circuit configured to receive a hot-plug detection signal (HPD) from the HDMI input device 30 via the pin 23A of the HDMI connector 23. The hot-plug detection signal is a signal indicating that the HDMI input device 30 is connected to the HDMI connector 23.

The DDC circuit 122 is configured to read the capability information of the HDMI input device 30 via the pins 23B of the HDMI connector 23. The sequence for reading the capability information is executed via a channel containing the two signal lines (DDC_SCL and DDC_SDA) for carrying capability information.

In the HDMI transmitter 105 side, the two signal lines (DDC_SCL and DDC_SDA) are connected to the power signal line (HDMI TX+5V) of the power supply circuit 110 via resistors R1 and R2.

The video signal transmitting circuit (TMDS TX) 123 is configured to transmit a video signal to the HDMI input device 30 via the pins 23C of the HDMI connector 23. The video signal is transmitted via the signal lines for carrying video signals, i.e., three transition minimized differential signaling (TMDS) data channels and a single TMDS clock channel. Each TMDS data channel contains a differential signal line pair.

The HDMI receiver 106 is configured to communicate with the HDMI output device (source device) 50, described in connection with FIG. 1, via the HDMI connector 23. When the HDMI input device 30 is connected to the HDMI connector 23, the HDMI receiver 106 does not need to operate. The HDMI receiver 106 communicates with the HDMI output device 50 and receives at least a video signal from the HDMI output device 50. The HDMI receiver 106 may receive both a video signal and an audio signal from the HDMI output device 50.

The HDMI receiver 106 is connected to the CPU 101. The HDMI receiver 106 includes a hot-plug control circuit 131, an EDID (Enhanced Extended Display Identification Data) ROM 132 and a video signal receiving circuit (TMDS RX) 133.

The hot-plug control circuit 131 is configured to transmit a hot-plug detection signal to the HDMI output device 50 via the pin 23A of the HDMI connector 23. The hot-plug control circuit 131 may transmit a hot-plug detection signal in response to reception of the power signal (HDMI_RX+5V) from the HDMI output device 50.

The EDID (Enhanced Extended Display Identification Data) ROM 132 is a memory which holds an EDID data structure. The EDID data structure is a kind of the capability information of the computer 10. The capability information is data indicative of the capability and characteristic regarding display of the computer 10 which functions as a sink device. Capability information such as the EDID data structure is read by the source device via the DDC channels (DDC_SCL and DDC_SDA). On the HDMI receiver 106 side, the two signal lines (DDC_SCL and DDC_SDA) are connected to the power signal (HDMI_RX+5V) line via the resistors R3 and R4. The power signal (HDMI_RX+5V) line is used to carry the power signal received from the HDMI output device 50.

The video signal receiving circuit (TMDS RX) 133 is configured to receive a video signal from the HDMI output device 50 via the pins 23C of the HDMI connector 23.

The HDMI multiplexer (HDMI_MUX) 107 switches the circuit to be connected to the HDMI connector 23 between the HDMI transmitter 105 and the HDMI receiver 106. The HDMI multiplexer (HDMI_MUX) 107 includes switching circuits 141, 142 and 143.

The switching circuit 141 is electrically connected to the hot-plug circuit 121, the hot-plug control circuit 131 and the pin 23A. More specifically, the switching circuit 141 includes a port A connected to the hot-plug circuit 121 via a buffer 111, a port B connected to the hot-plug control circuit 131 and a port C connected to the pin 23A.

The switching circuit 141 electrically connects one of the hot-plug circuit 121 and the hot-plug control circuit 131 to the pin 23A. When the HDMI connector 23 is set as an HDMI output port, the switching circuit 141 selects the port A and connects the port A and the port C to each other. Thus, the switching circuit 141 electrically connects the hot-plug circuit 121 to the pin 23A. On the other hand, when the HDMI connector 23 is set as an HDMI input port, the switching circuit 141 selects the port B and connects the port B and the port C to each other. Thus, the switching circuit 141 electrically connects the hot-plug control circuit 131 to the pin 23A.

As described above, the switching circuit 141 switches the circuit to be connected to the pin 23A between the hot-plug circuit 121 and the hot-plug control circuit 131.

The switching circuit 142 is electrically connected to the DDC circuit 122, the EDID ROM 132 and the pins 23B. In other words, the switching circuit 142 includes the port A connected to the DDC circuit 122 via the buffer 112, the port B connected to the EDID ROM 132 and the port C connected to the pins 23B.

The switching circuit 142 electrically connects one of the DDC circuit 122 and the EDID ROM1 32 to the pins 236. When the HDMI connector 23 is set as an HDMI output port, the switching circuit 142 selects the port A and connects the port A and the port C to each other. Thus, the switching circuit 142 electrically connects the DDC circuit 122 to the pins 23B. On the other hand, when the HDMI connector 23 is set as an HDMI input port, the switching circuit 142 selects the port B and connects the port B and the port C to each other. Thus, the switching circuit 142 electrically connects the EDID ROM 132 to the pins 23B.

As described, the switching circuit 142 switches the circuit to be connected to the pins 23B between the DDC circuit 122 and the EDID ROM 132.

The switching circuit 143 is electrically connected to the video signal transmitting circuit (TMDS TX) 123, the video signal receiving circuit (TMDS RX) 133 and the pins 23C. That is, the switching circuit 143 includes the port A connected to the video signal transmitting circuit (TMDS TX) 123, the port B connected to the video signal receiving circuit (TMDS RX) 133 and the port C connected to the pins 23C.

The switching circuit 143 electrically connects one of the video signal transmitting circuit (TMDS TX) 123 and the video signal receiving circuit (TMDS RX) 133 to the pins 23C. When the HDMI connector 23 is set as an HDMI output port, the switching circuit 143 selects the port A and connects the port A and the port C to each other. Thus, the switching circuit 143 electrically connects the video signal transmitting circuit (TMDS TX) 123 to the pins 23C. On the other hand, when the HDMI connector 23 is set as an HDMI input port, the switching circuit 143 selects the port B and connects the port B and the port C to each other. Thus, the switching circuit 143 electrically connects the video signal receiving circuit (TMDS RX) 133 to the pins 23C.

As described above, the switching circuit 143 switches the circuit to be connected to the pins 23C between the video signal transmitting circuit (TMDS TX) 123 and the video signal receiving circuit (TMDS RX) 133.

The CPU 101 comprises a general-purpose IO port (GPIO) 113 and supplies a control signal (HDMI_SEL) to the switching circuits 141, 142 and 143 from the GPIO 113. When the control signal (HDMI_SEL) is at a "Low" level, each of the switching circuits 141, 142 and 143 selects the port A and connects the port A and the port C to each other. When the signal (HDMI_SEL) is at a "High" level, each of the switching circuits 141, 142 and 143 selects the port B and connects the port B and port C to each other.

When the HDMI connector 23 should be set as an HDMI output port, the CPU 101 makes the control signal (HDMI_SEL) to the "Low" level. Thus, the hot-plug circuit 121, the DDC circuit 122 and the video signal transmitting circuit (TMDS TX) 123 can be connected to the pin 23A, the pins 23B and the pins 23C of the HDMI connector 23, respectively.

On the other hand, when the HDMI connector 23 should be switched to an HDMI input port, the CPU 101 makes the control signal (HDMI_SEL) to the "High" level. Thus, the hot-plug control circuit 131, the EDID ROM 132 and the video signal receiving circuit (TMDS RX) 133 can be connected to the pin 23A, the pins 23B and the pins 23C of the HDMI connector 23, respectively.

The switching circuit (SW1) 108 is electrically connected to the power supply circuit 110 and the pin 239. That is, the switching circuit (SW1) 108 is inserted between the power supply circuit 110 and the pin 23D and can electrically connect the power supply circuit 110 to the pin 23D or electrically disconnect the power supply circuit 110 from the pin 23D. When the HDMI connector 23 is set as an HDMI output port, the switching circuit (SW1) 108 is set to a conducting state and thus electrically connects the power supply circuit 110 to the pin 23D. When the HDMI connector 23 is set as an HDMI input port, the switching circuit (SW1) 108 is set to a non-conducting state and thus electrically disconnects the power supply circuit 110 from the pin 23D.

The switching circuit (SW2) 109 is electrically connected to the hot-plug control circuit 131 and the pin 23D. That is, the switching circuit (SW2) 109 is inserted between the hot-plug control circuit 131 and the pin 23D and can electrically connect the hot-plug control circuit 131 to the pin 23D or electrically disconnect the hot-plug control circuit 131 from the pin 23C. When the HDMI connector 23 is set as an HDMI output port, the switching circuit (SW2) 109 is set to a non-conducting state and thus electrically disconnect the hot-plug control circuit 131 from the pin 23B. When the HDMI connector 23 is set as an HDMI input port, the switching circuit (SW2) 109 is set to a conducting state and thus electrically connects the hot-plug control circuit 131 to the pin 23D.

The CPU 101 supplies control signals (SW_SEL1 and SW_SEL2) to the switching circuits (SW1 and SW2) 108 and 109, respectively, via the GPIO 113. When the control signal (SW_SEL1) is at the "Low" level, the switching circuit (SW1) 108 is in an off state (non-conducting). When the control signal (SW_SEL1) is at the "High" level, the switching circuit (SW1) 108 is an on state (conducting). When the control signal (SW_SEL2) is at the "Low" level, the switching circuit (SW2) 109 is in the off state (non-conducting). When the control signal (SW_SEL2) is at the "High" level, the switching circuit (SW2) 109 is in the on state (conducting).

In the HDMI input device 30, the HDMI connector 31 includes a pin 31A to which a signal line (HOT-PLUG) for carrying a hot-plug detection signal is assigned, pins 31B to which signal lines (DDC_SCL, DDC_SDA) for carrying capability information are assigned, pins 31C to which signal lines (TMDS_DATA, TMDS_CLK) for carrying video signals are assigned, and a pin 31D to which a +5V power signal line is assigned, and the like.

The pin 23D of the HDMI connector 23 and the pin 31D of the HDMI connector 31 are connected to each other via the HDMI cable 100. Similarly, the pin 23A of the HDMI connector 23 and the pin 31A of the HDMI connector 31 are connected to each other via the HDMI cable 100. The pins 23B of the HDMI connector 23 and the pins 31B of the HDMI connector 31 are connected to each other via the HDMI cable 100. The pins 23C of the HDMI connector 23 and the pins 31C of the HDMI connector 31 are connected to each other via the HDMI cable 100.

In the HDMI input device 30, the HDMI receiver 32 includes a hot-plug control circuit 41, an EDID ROM1 42 and a video signal receiving circuit (TMDS RX) 43.

The hot-plug control circuit 41 is configured to transmit a hot-plug detection signal to the computer 10 via the pin 31A of the HDMI connector 31. The hot-plug control circuit 41 may transmit a hot-plug detection signal in response to reception of a power signal from the computer 10.

The EDID ROM 42 is a memory which holds an EDID data structure. The EDID data structure is a kind of the capability information of the HDMI input device 30. The capability information is data indicative of the capability and characteristic regarding display of the HDMI input device 30, which functions as a sink device. Capability information such as the EDID data structure is read by the source device via the DDC channels (DDC_SCL, DDC_SDA) described above. The two signal lines (DDC_SCL, DDC_SDA) are connected to the power signal line via the resistors R5 and R6.

The video signal receiving circuit (TMDS RX) 43 is configured to receive a video signal from the computer 10 via the pins 31C of the HDMI connector 31.

In the case where the computer 10 is operated as a source device as shown in FIG. 2, the HDMI connector 23 of the computer 10 is set as an output port. Each switching circuit of the HDMI_MUX 107, the switching circuit (SW1) 108 and the switching circuit (SW2) 109 are set as follows via the GPIO 113 of the CPU 101. In this manner, the HDMI connector 23 of the computer 10 can function as an output port.

SW1=ON
SW2=OFF
HDMI_MUX C=A

When the HDMI input device 30 is connected to the HDMI connector 23, a +5V power signal from the power supply circuit 110 is transmitted to the hot-plug control circuit 41 of the HDMI input device 30 via the switching circuit (SW1) 108 and the pin 23D of the HDMI connector 23. In response to the reception of the +5V power signal, the hot-plug control circuit 41 outputs a hot-plug detection signal. The hot-plug detection signal is sent to the hot-plug circuit 121 of the HDMI transmitter 105 via the pin 23A of the HDMI connector 23, the switching circuit 141 and the buffer 111.

The HDMI transmitter 105 detects, in response to the reception of the hot-plug detection signal, that the HDMI input device 30 is connected to the HDMI connector 23. In response to the detection of the connection of the HDMI input device 30, the DDC circuit 122 of the HDMI transmitter 105 executes processing for reading the capability information of the HDMI input device 30. In this case, a read request signal from the DDC circuit 122 is transmitted to the EDID ROM 42 of the HDMI input device 30 via the buffer 112, a pin 23B (DDC_SCL pin) of the HDMI connector 23 and the switching circuit 142. The capability information read from the EDID ROM 42 is transmitted to the DDC circuit 122 via a pin 23B (DDC_SDA pin) of the HDMI connector 23, the switching circuit 142 and the buffer 112. The HDMI transmitter 105 determines a video signal transmission format to be used (that is, the number of lanes of data channels to be used, the data transfer rate per lane, the amplitude of a video signal, and the like) based on the capability information. The video signal transmitting circuit (TMDS TX) 123 of the HDMI transmitter 105 transmits video signals in the determined video signal transmission format. The video signals and a clock signal are transmitted to the video signal receiving circuit (TMDS RX) 43 of the HDMI input device 30 via the switching circuit 143 and the pins 23C of the HDMI connector 23.

FIG. 3 shows the relationship between the computer (PC) 10 and the HDMI output device 50.

The HDMI output device 50 includes the HDMI connector 51, an HDMI transmitter 52 and a power supply circuit 53 and the like.

The HDMI connector 51 includes a pin 51A to which a signal line (HOT-PLUG) for carrying a hot-plug detection signal is assigned, pins 51B to which signal lines (DDC_SCL, DDC_SDA) for carrying capability information are assigned, pins 51C to which signal lines (TMDS_DATA, TMDS_CLK) for carrying video signals are assigned, a pin 510 to which a +5V power signal line is assigned, and the like.

The pin 23D of the HDMI connector 23 and the pin 51D of the HDMI connector 51 are connected to each other via the HDMI cable 100. Similarly the pin 23A of the HDMI connector 23 and the pin 51A of the HDMI connector 51 are connected to each other via the HDMI cable 100. The pins 23B of the HDMI connector 23 and the pins 51E of the HDMI connector 51 are connected to each other via the HDMI cable 100. The pins 23C of the HDMI connector 23 and the pins 51C of the HDMI connector 51 are connected to each other via the HDMI cable 100.

The HDMI transmitter 52 includes a hot-plug circuit 61, a DDC circuit 62, a video signal transmitting circuit (TMDS TX) 63 and the like. The hot-plug circuit 61, the DDC circuit 62 and the video signal transmitting circuit (TMDS TX) 63 have functions similar to those of the hot-plug circuit 121, the DDC circuit 122, and the video signal transmitting circuit (TMDS TX) 123 in the HDMI transmitter 105 of the computer 10.

In the case where the computer 10 is operated as a sink device as shown in FIG. 3, the HDMI connector 23 of the computer 10 is set as an input port. Each switching circuit of the HDMI_MUX 107, the switching circuit (SW1) 108 and the switching circuit (SW2) 109 are set as follows via the GPIO 113 of the CPU 101. In this manner, the HDMI connector 23 of the computer 10 can function as an input port.

SW1=OFF
SW2=ON
HDMI_MUX C=B

When the HDMI output device 50 is connected to the HDMI connector 23, a +5V power signal from the power supply circuit 53 of the HDMI output device 50 is transmitted to the hot-plug control circuit 131 of the HDMI receiver 106 via the pin 23D of the HDMI connector 23 and the switching circuit (SW2) 109. In response to the reception of the +5V power signal, the hot-plug control circuit 131 outputs a hot-plug detection signal. The hot-plug detection signal is sent to the hot-plug circuit 61 of the HDMI output device 50 via the switching circuit 141 and the pin 23A of the HDMI connector 23.

The HDMI transmitter 52 of the HDMI output device 50 detects, in response to the reception of the hot-plug detection signal, connection between the computer 10 (sink device) and the HDMI output device 50. In response to the detection of this connection, the DDC circuit 62 of the HDMI transmitter 52 executes processing for reading the capability information of the computer 10 (sink device). In this case, a read request signal from the DDC circuit 62 is transmitted to the EDID ROM 132 of the HDMI receiver 106 via the pin 23B (DDC_SCL pin) of the HDMI connector 23 and the switching circuit 142. The capability information read from the EDID ROM 132 is transmitted to the DDC circuit 62 of the HDMI output device 50 via the switching circuit 142 and the pin 235 (DDC_SDA pin) of the HDMI connector 23. The HDMI transmitter 52 determines a video signal transmission format to be used (that is, the number of lanes of data channels to be used, the data transfer rate per lane, the amplitude of a video signal, and the like) based on the capability information. The video signal transmitting circuit (TMDS TX) 63 of the HDMI transmitter 52 transmits video signals in the determined video signal transmission format. The video signals and a clock signal are transmitted to the video signal receiving circuit (TMDS RX) 133 of the HDMI receiver 106 via the pins 23C of the HDMI connector 23 and the switching circuit 143.

Next, the processing of switching the HDMI connector 23 of the computer 10 between an HDMI input port and output port will be described. Switching between the HDMI input port and output port may be accomplished automatically based on detection of the type (sink device/source device) of the external device connected to the HDMI connector 23. Alternatively, the switching of the HDMI input port/output port may be based on a user input. The CPU 101 may display a setting screen for switching the HDMI connector 23 between an HDMI input port and output port by executing the port switching utility program.

The setting value (port setting value) which indicates the mode (an input port/output port) of the HDMI connector 23 set by the user is saved in the flash ROM 104. "Port setting value=0" indicates an output port (HDMI output port), whereas "Port setting value=1" indicates an input port (HDMI input port). The default value of the port setting value may be, for example, 0. In this manner, the HDMI connector 23 can normally be used as an output port, and if needed, the HDMI connector 23 can be switched to an input port.

When the power of the computer 10 is turned on, the CPU 101 sets the HDMI connector 23 to the mode (an input port/output port) indicated by the setting value in the flash ROM 104 under the control of the BIOS. Thus, the contents of the setting value of the HDMI connector 23 can be automatically reflected in the HDMI connector 23 at the time of power-on of the computer 10. Therefore, once the HDMI connector 23 is switched to an input port, the HDMI connector 23 is automatically set as an input port each time the power of the computer 10 is turned on.

A flowchart of FIG. 4 shows a procedure of the port setting process executed by the computer 10.

When the power of the computer 10 is turned on, the CPU 101 first executes the BIOS. Under the control of the BIOS, the CPU 101 executes the following port setting process.

When the power of the computer 10 is turned on, the signals SW_SEL1, SW_SEL2 and HDMI_SEL are set to the following levels, respectively, specified by the hardware initial value (Step S11).
SW_SEL1=Low
SW_SEL2=Low
HDMI_SEL=Low As a result, each switching circuit of the HDMI_MUX 107, the switching circuit (SW1) 108 and the switching circuit (SW2) 109 are set as follows.
SW1=OFF
SW2=OFF
HDMI_MUX C=A The CPU 101 reads the port setting value in the flash ROM 104 (Step S12). Then, the CPU 101 controls the HDMI multiplexer (HDMI_MUX) 107, the switching circuit (SW1) 108 and the switching circuit (SW2) 109 based on the port setting value, and thus sets the HDMI connector 23 to the mode specified by the port setting value (Steps S13, S14 and S15).

The following processes are executed in steps S13, S14 and S15.

Figure 5:
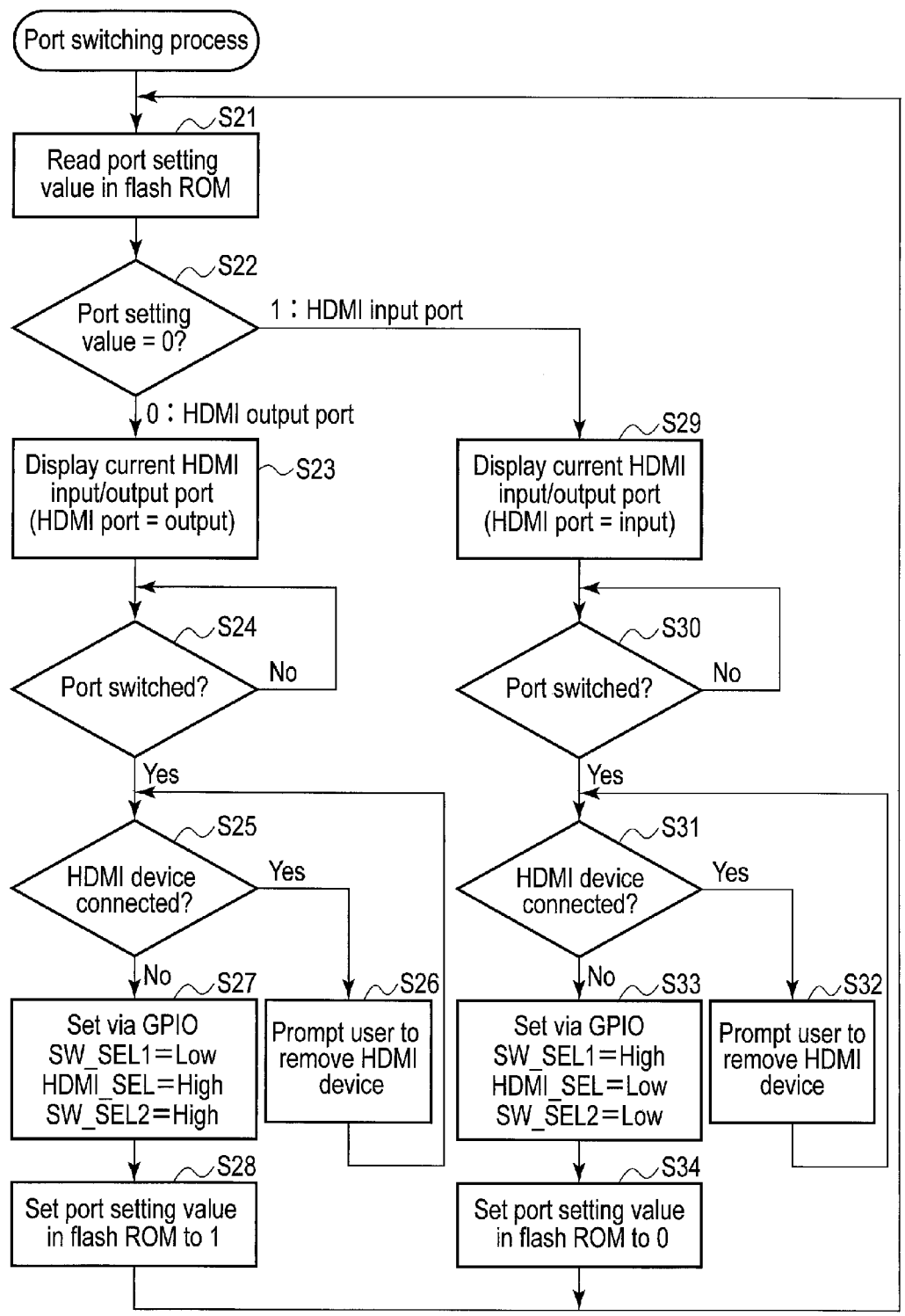
FIG. 5 is an exemplary flowchart of the procedure of the port switching process executed by the electronic device of the embodiment.

In Step S13, the CPU 101 determines whether or not the port setting value is 0. If the port setting value is 0, the processing proceeds to Step S14. In Step S14, the CPU 101 respectively sets signals SW_SEL1, SW_SEL2 and HDMI_SEL to the following levels via the GPIO 113.
SW_SEL1=High
SW_SEL2=Low
HDMI_SEL=Low As a result, each switching circuit of the HDMI_MUX 107, the switching circuit (SW1) 108 and the switching circuit (SW2) 109 are set as shown below. Thus, the HDMI connector 23 of the computer 10 can function as an HDMI output port.
SW1=ON
SW2=OFF
HDMI_MUX C=A On the other hand, if the port setting value is 1, the processing proceeds to Step S15. In Step S15, the CPU 101 respectively sets signals SW_SEL1, SW_SEL2 and HDMI_SEL to the following levels via the GPIO 113.
SW_SEL1=Low
SW_SEL2=High
HDMI_SEL=High As a result, each switching circuit of the HDMI_MUX 107, the switching circuit (SW1) 108 and the switching circuit (SW2) 109 are set as follows. Thus, the HDMI connector 23 of the computer 10 can function as an HDMI input port.
SW1=OFF
SW2=ON
HDMI_MUX C=B A flowchart of FIG. 5 shows a port switching process executed by the computer 10.

After the operating system is booted, the user can start the port switching utility program, if needed. The port switching utility program executes processing of switching the mode of the HDMI connector 23 between an HDMI input port and an HDMI output port based on the user input.

When the port switching utility program is started, the CPU 101 executes the following processing under the control of the port switching utility program.

The CPU 101, first, reads the port setting value in the flash ROM 104 (Step S21).

The CPU 101 determines whether or not "port setting value=0" (Step S22). If the port setting value=0, the CPU 101 displays the current mode of the HDMI connector 23 on a setting screen of FIG. 6 which is displayed on an LCD 12A by the port switching utility program (Step S23). Here, since the current mode of the HDMI connector 23 is an HDMI output port, the message "HDMI port=output" is displayed.

Figure 6:
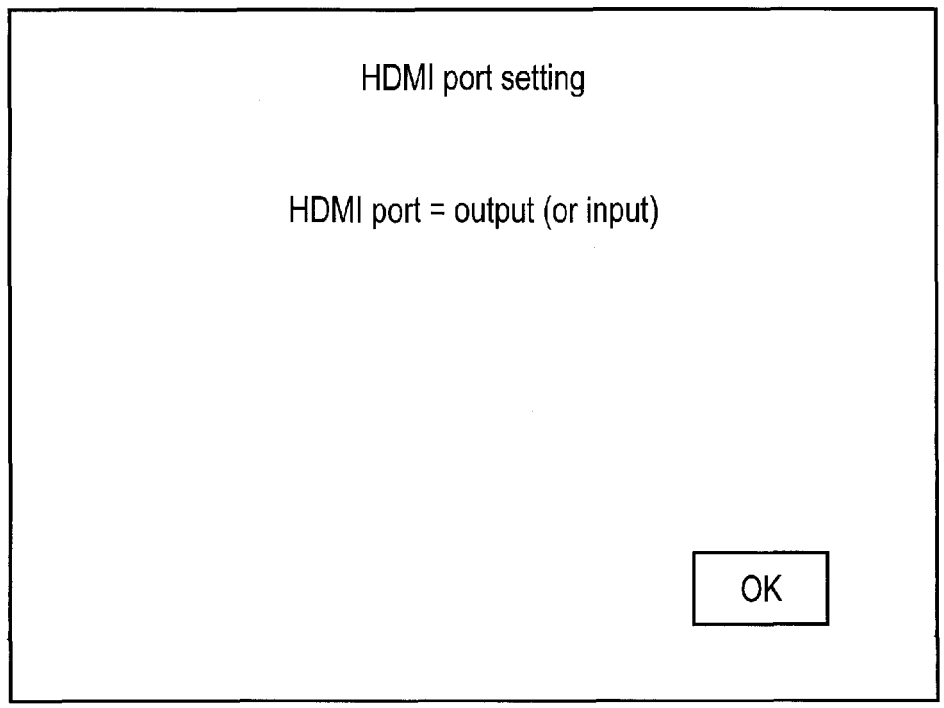
FIG. 6 is an exemplary diagram showing a port setting screen displayed by the electronic device of the embodiment.

The settings screen of FIG. 6 functions as a graphical user interface (GUI) for switching the mode of the HDMI connector 23 between an HDMI input port and an HDMI output port. By operating on the settings screen, the user can request to change the mode of the HDMI connector 23 to an input port from an output port, or the mode of the HDMI connector 23 to an output port from an input port.

The CPU 101 detects the occurrence of the user input for requesting to change to input port from output port (Step S24). If the user input for requesting to change to input port from an output port is detected (YES in Step S24), the CPU 101 determines whether or not the HDMI device is presently connected to the HDMI connector 23 (Step S25). If the HDMI device is presently connected to the HDMI connector 23 (YES in Step S25), the CPU 101 prompts the user to disconnect the HDMI device presently connected from the HDMI connector 23 by displaying the message "Disconnect HDMI device" on the settings screen (Step S26). This is because it is a highly probable that the HDMI device presently connected is a sink device.

After the HDMI device presently connected is disconnected from the HDMI connector 23, the CPU 101 sets respectively the signals SW_SEL1, SW_SEL2 and HDMI_SEL to the following levels via the GPIO 113 (Step S27).

SW_SEL1=Low
SW_SEL2=High
HDMI_SEL=High

As a result, each switching circuit of the HDMI_MUX 107, the switching circuit (SW1) 108 and the switching circuit (SW2) 109 are set as follows. Thus, the HDMI connector 23 of the computer 10 can function as an HDMI input port.

SW1=OFF
SW2=ON
HDMI_MUX C=B

After this, the CPU 101 updates the port setting value in the flash ROM 104 and sets the port setting value to 1 (Step S28).

In Step S22, if the port setting value=1, the CPU 101 displays "HDMI port=input" on the settings screen of FIG. 6 (Step S29).

The CPU 101 detects the occurrence of a user input for requesting to change to output port from input port (Step S30). When the user input for requesting to change to output port from input port is detected (YES in Step S30), the CPU 101 determines whether or not an HDMI device is presently connected to the HDMI connector 23 (Step S31). If an HDMI device is presently connected to the HDMI connector 23 (YES in Step S31), the CPU 101 prompts the user to disconnect the HDMI device from the HDMI connector 23 by displaying the message "Disconnect HDMI device" on the operation menu (Step S32).

After the HDMI device is disconnected from the HDMI connector 23, the CPU 101 respectively sets the signal SW_SEL1, SW_SEL2 and HDMI_SEL to the following levels via the GPIO 113 (Step S33).

SW_SEL1=High
SW_SEL2=Low
HDMI_SEL=Low

As a result, each switching circuit of the HDMI_MUX 107, the switching circuit (SW1) 108 and the switching circuit (SW2) 109 are set as follows. Thus, the HDMI connector 23 of the computer 10 can function as an HDMI output port.

SW1=ON
SW2=OFF
HDMI_MUX C=A

After this, the CPU 101 updates the port setting value in the flash ROM 104 and sets the port setting value to 0 (Step S34).

The above-provided description is directed to an example in which user input for requesting to switch between input port and output port is detected based on the user's operation on the settings screen, that is, the user input on the settings screen. But the user input for requesting to switch between an input port and output port may be detected on the basis of whether or not a specific combination of keys on the keyboard 13 is pressed by the user.

In this embodiment, the hardware configuration of the switching circuits shown in FIG. 2 is applied to an HDMI connector is exemplified. But a hardware configuration similar to that of the switching circuits can be applied not only to an HDMI connector but also to a DisplayPort (DP) connector.

A DisplayPort (DP) connector comprises a pin to which a signal line (HOT-PLUG) for carrying a hot-plug detection signal is assigned, pins to which signal lines (AUX channels) for carrying various data items including capability information, etc., are assigned, pins to which signal lines (three main channels) for carrying video signals are assigned, a pin to which a power signal line is assigned, and the like. The circuit to be connected to the pins to which the signal lines for carrying a hot-plug detection signal is assigned, is switched by a first switching circuit between a hot-plug detection receiving circuit of a DisplayPort transmitter and a hot-plug detection transmitting circuit of a DisplayPort receiver. The circuit to be connected to the pins to which the signal lines for carrying capability information are assigned is switched by a second switching circuit between a control circuit of the DisplayPort transmitter and a memory of the DisplayPort receiver. The circuit to be connected to the pins to which the signal lines for carrying at least video signals are assigned is switched by a third switching circuit between a video transmitting circuit of the DisplayPort transmitter and a video receiving circuit of the DisplayPort receiver.

Usually, a device such a monitor comprises a power supply circuit. Therefore, the hot-plug detection transmitting circuit of the Displayport receiver may be configured to output the hot-plug detection signal at all times regardless of whether the power signal is received from the DisplayPort (DP) connector.

As described above, in this embodiment, the circuit to be connected to the pin to which the signal line for carrying a hot-plug detection signal is assigned is switched by the first switching circuit between the hot-plug detection receiving circuit of the transmitter and the hot-plug detection transmitting circuit of the receiver. In addition, the circuit to be connected to the pins to which the signal lines for carrying capability information are assigned is switched by the second switching circuit between the control circuit of the transmitter and the memory of the receiver. The pins to which the signal lines for carrying at least video signals are assigned is switched by the third switching circuit between the video transmitting circuit of the transmitter and the video receiving circuit of the receiver.

With the above-described structure, one connector 23 can realize both functions of video signal output and video input without necessity to provide two connectors, namely, an output connector for video outputs and an input connector for video inputs, in the computer main body 11.

Moreover, in this embodiment, the setting value (port setting value) indicating the mode (input port/output port) of the connector 23 set by the user is saved in the flash ROM 104, which is a nonvolatile memory. When the power of the computer 10 is turned on, the connector 23 is automatically set to the mode (input port/output port) indicated by the setting value in the flash ROM 104. Thus, the contents of the setting value can be automatically reflected in the connector 23 at the time of power-on of the computer 10.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a housing comprising a connector configured to connect to an external device, the connector comprising:
        a first pin to which a signal line for carrying a hot-plug detection signal is assigned,
        second pins to which signal lines for carrying capability information are assigned, and
        third pins to which signal lines for carrying at least video signals are assigned;
    a transmitter configured to communicate with a sink device via the connector, the transmitter comprising:
        a hot-plug detection receiving circuit configured to receive a hot-plug detection signal from the sink device via the connector,
        a control circuit configured to read capability information of the sink device via the connector, and
        a video transmitting circuit configured to transmit a video signal to the sink device via the connector;
    a receiver configured to communicate with a source device via the connector, the receiver comprising:
        a hot-plug detection transmitting circuit configured to transmit a hot-plug detection signal to the source device via the connector,
        a memory configured to hold the capability information of the electronic device, and
        a video receiving circuit configured to receive a video signal from the source device via the connector;
    a first switching circuit configured to electrically connect one of the hot-plug detection receiving circuit and the hot-plug detection transmitting circuit to the first pin, the first switching circuit electrically connecting the hot-plug detection receiving circuit to the first pin when the connector is set as an output port for outputting a video signal, the first switching circuit electrically connecting the hot-plug detection transmitting circuit to the first pin when the connector is set as an input port for inputting a video signal;
    a second switching circuit configured to electrically connect one of the control circuit and the memory to the second pins, the second switching circuit electrically connecting the control circuit to the second pins when the connector is set as the output port, the second switching circuit electrically connecting the memory to the second pins when the connector is set as the input port; and
    a third switching circuit configured to electrically connect one of the video transmitting circuit and the video receiving circuit to the third pins, the third switching circuit electrically connecting the video transmitting circuit to the third pins when the connector is set as the output port, the third switching circuit electrically connecting the video receiving circuit to the third pins when the connector is set as the input port.

2. The electronic device of claim 1, wherein the connector is a High-Definition Multimedia Interface (HDMI) connector.

3. The electronic device of claim 1, wherein the connector is a Displayport (DP) connector.

4. The electronic device of claim 1, wherein
    the connector further comprises a fourth pin to which a power signal line is assigned, and
    the electronic device further comprises:
        a power supply circuit configured to supply a power signal to the sink device via the connector; and
        a fourth switching circuit electrically connected to the power supply circuit and the fourth pin, the fourth switching circuit configured to electrically connect the power supply circuit to the fourth pin when the connector is set as the output port and disconnect the power supply circuit from the fourth pin when the connector is set as the input port.

5. The electronic device of claim 4, further comprising a fifth switching circuit electrically connected to the hot-plug detection transmitting circuit and the fourth pin, the fifth switching circuit configured to electrically disconnect the hot-plug detection transmitting circuit from the fourth pin when the connector is set as the output port and electrically connect the hot-plug detection transmitting circuit to the fourth pin when the connector is set as the input port.

6. The electronic device of claim 1, further comprising a processor configured to control the first switching circuit, the second switching circuit, and the third switching circuit to switch a mode of the connector between a first mode where the connector is used as the output port and a second mode where the connector is used as the input port based on a user input.

7. The electronic device of claim 6, wherein the processor is configured to:
    save, in a nonvolatile memory, a setting value indicating to which of the first mode and the second mode the connector is set, and
    control the first switching circuit, the second switching circuit, and the third switching circuit to set the connector to one of the first mode and the second mode indicated by the setting value at power-on of the electronic device.

8. The electronic device of claim 6, wherein the processor is further configured to:
    detect a user input requesting a change from the first mode to the second mode or from the second mode to the first mode;
    determine whether the external device is being connected to the connector in response to detection of the user input;
    prompt a user to disconnect the external device from the connector when the external device is being connected to the connector; and
    control the first switching circuit, the second switching circuit, and the third switching circuit to switch the connector to one of the first mode and the second mode designated by the user input after the external device is disconnected.

* * * * *